March 21, 1944.  O. LIERMANN  2,344,827
PNEUMATIC TIRE
Filed June 11, 1942  2 Sheets-Sheet 1
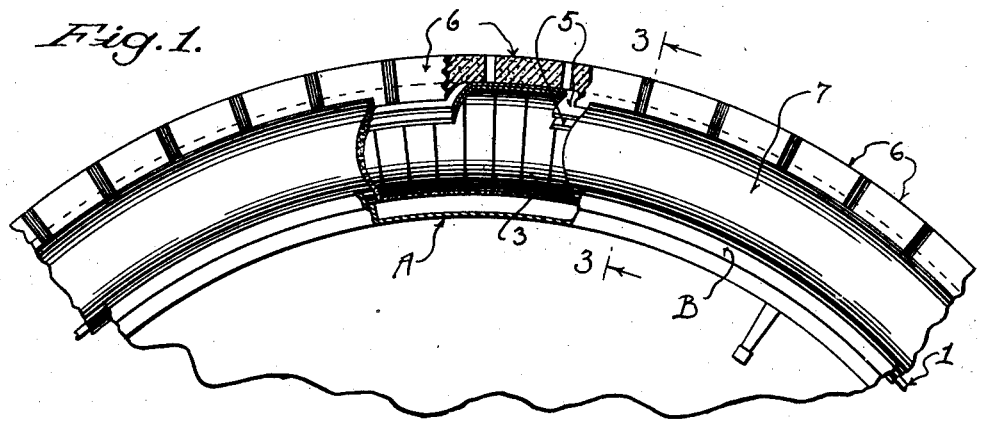
Fig. 1.
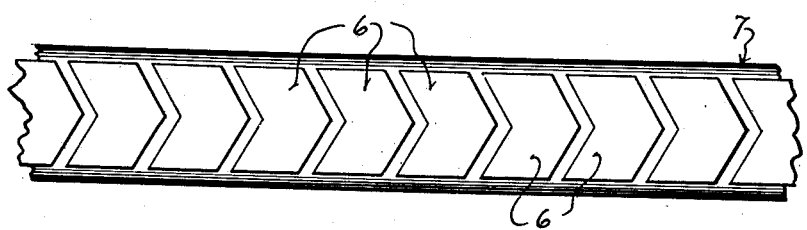
Fig. 2.
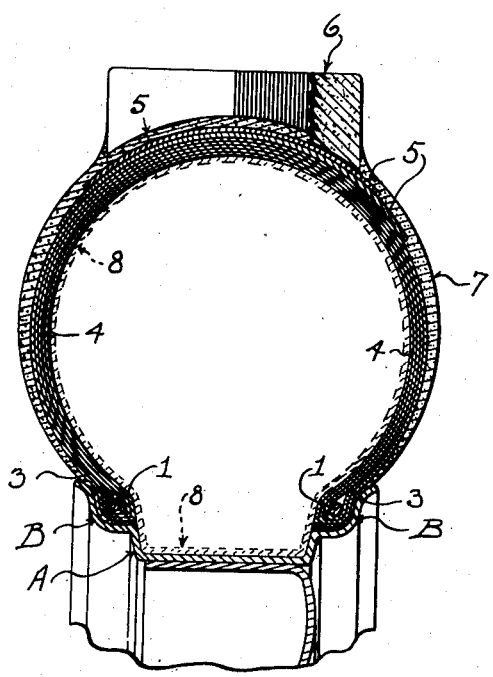
Fig. 3.
INVENTOR
ORVILLE LIERMANN
BY 
ATTORNEYS March 21, 1944.  O. LIERMANN  2,344,827
PNEUMATIC TIRE
Filed June 11, 1942  2 Sheets-Sheet 2

INVENTOR
ORVILLE LIERMANN
BY

ATTORNEYS

Patented Mar. 21, 1944

2,344,827

UNITED STATES PATENT OFFICE 2,344,827

PNEUMATIC TIRE

Orville Liermann, Manitowoc, Wis.

Application June 11, 1942, Serial No. 446,552

1 Claim. (Cl. 152—330)

My invention has for its object to provide a non-rubber casing for pneumatic tires, the same being simple in construction, durable, flexible and wear resistant.

The specific object of my invention is to provide a tire casing built up from a pair of metallic bead hoops carrying multiple layers of canvas freely mounted one upon the other and cemented at the tread thereof, with spaced cleaths, the side walls and surface between cleats being finished by a skin embodying a mixture of asphalt and asbestos whereby flexibility is insured.

With the above objects in view, the invention consists in certain pecularities of construction and combination of parts as will be fully set forth hereinafter with reference to the accompanying drawings and subsequently claimed.

In the drawings—

Figure 1 represents a fragmentary elevation of a tire casing embodying the features of my invention with parts broken away and in section to more clearly illustrate structural features.

Figure 2 is a plan view of the same.

Figure 3 is a magnified cross sectional view of the tire mounted upon a suitable rim, the section being indicated by line 3—3 of Figure 1.

Referring by characters to the drawings with special reference to Figures 1 to 3 inclusive A indicates a metallic wheel rim having bead flanges B. Mounted in the bead flanges B is the casing bead having core hoops 1—1 embedded in a series of canvas layers 3. The side walls 4—4 of the canvas layers, while tightly nested together, are disconnected to permit freedom of movement whereby resiliency is obtained. The tread portion of the canvas layers, which form a tube, has fitted thereto breaker strips 5. The breaker strips 5 are adhesively secured to the tread walls by cement, preferably synthetic resin which will impregnate the breaker strips and also the walls of the tube thereunder, whereby said walls of the canvas tube at this point are adhesively bound together.

A series of cleat blocks 6 are then adhesively secured to the outer breaker strip and spaced apart as best shown in Figures 1 and 2 of the drawings.

While the formation of said blocks may be varied, as shown in Figure 2 of the drawings, I prefer to mold the same in spearhead shape whereby angular parallel spaces are formed therebetween to insure shedding of gravel or the like. In practical tests I have found that it is desirable to mold the tread blocks from a composition including:

Two parts dried sawdust

One part synthetic resin (Cascamite)

One dram black dye to every ½# of above mixture

One sixth pint water to each pint sawdust whereby the blocks are acid proof.

The above elements are first mixed dry and thereafter water is added and the ingredients are again mixed. The above formula for producing the blocks or cleats will insure the minimum of wear. The tire is then completed by a pliable skin coating 7 which extends throughout the entire outer surface of the tube and between the cleats as best shown in Figure 3 and a thin coating or wash (not shown) may also be applied to the cleats.

This skin coating 7 is composed briefly of a mixture of asphalt and asbestos obtained in open market ready mixed and is known to the trade as "Rutland." The mixture is spread on the surface at a high temperature by a blow torch.

The coating specifically embodies the following formula:

| | Parts |
|---|---|
| Asbestos | 1 |
| Asphalt | 7 |
| Non-oxidizing agent | 1 |

The canvas side walls of the tire casing are thickly coated with the above noted compound and subjected to high blow torch temperature, whereby the skin is baked and fused and thus impregnates the outer layers of the casing.

By employing this method of coating, the side walls are rendered moist proof, heat proof, and will not crack or peel, while at the same time said walls will retain their flexibility due to the non-oxidizing agent and to all purposes the synthetic rubber substitute meets present tire problems. It should also be understood that the cleat blocks when adhesively positioned upon the tire tread are subjected to pressure insuring rigid adhesion of the same whereby said blocks will not strip when subjected to load strain.

Figure 4:
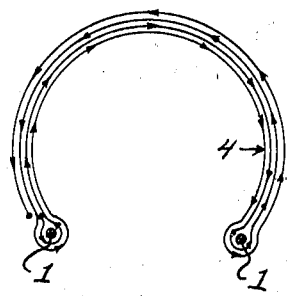
Figure 4 is a diagrammatic end view of a pair of tire beads particularly illustrating the method of winding several layers of canvas strip about the beads.
Figure 5:
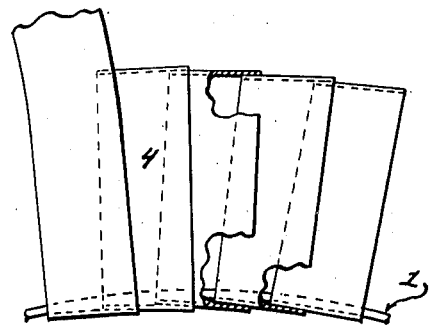
Figure 5 is a vertical elevation of the same particularly illustrating the spiral winding of the canvas strip.
Figure 6:
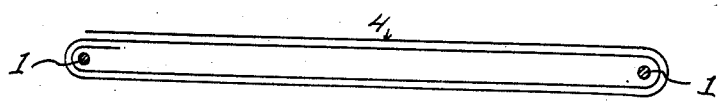
Figure 6 is a diagrammatic view illustrating a pair of bead blocks spread apart and having wound thereon the tape preparatory to being formed into a circular shape for the reception of a rubber inflation tube.

As shown in the diagrammatic view, Figure 6, the fabric band, which is of indefinite length can be conveniently positioned by spacing the metal endless hoops 1, at a predetermined distance controlling the diameter of the casing and the canvas is thereafter wound about the spaced beads as shown to develop the desired number of layers. The layers of canvas are then formed in the proper diameter as best shown in Figure 3, it being understood as indicated in Figure 5 of the drawings that the canvas strip or tape, is spirally wound upon itself with a slight overlap and the diagrammatic view Figure 4, illustrates the windings when brought to approximately tubular shape. It will be noted as indicated in Figure 3 of the drawings, a rubber inflation tube 8 is mounted in the casing in the usual manner and in practice it has been found that the tire may be successfully used at a low air pressure of approximately 14#.

Figure 8:
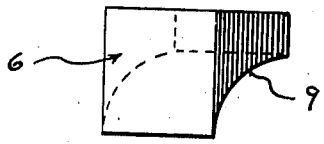
Figure 8 is a side elevation view of the same.
Figure 7:
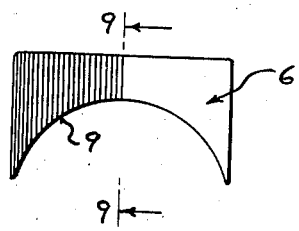
Figure 7 is an end elevation of one of the cleat blocks on an enlarged scale.
Figure 9:
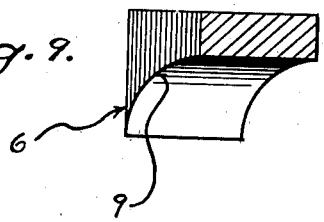
Figure 9 is a cross section through the cleat blocks, the section being indicated by line 9—9 of Figure 7.
Figure 9:

Figures 7 to 9 inclusive illustrate the preferred tread block, having a flat spearhead ground engaging surface and a concavo convexed bottom surface conforming to the surface of the tread tube. However, it is understood that the tire casings may be utilized for heavy duty purposes or for bicycle equipment and due to the peculiar construction just described, it should be noted that the tire develops ample resiliency and is wear resisting and furthermore due to the simplicity of the construction of a tire of this general type it may be manufactured at high speed with a minimum of equipment.

While I have shown and described one specific examplification of my invention minutely as to detail, it is understood that I may vary the structural features within the scope of the claim.

I claim:

In a tire casing comprising metallic bead hoops, a canvas strip wound about said hoops to form a tubular base of multiple layers and cleat blocks adhesively secured to the casing tread; the combination of a pliable skin coating enveloping the side walls of said casing composed of one part asbestos, seven parts asphalt, and one part non-oxidizing agent, whereby said casing side walls are protected and indefinitely retain their resiliency.

ORVILLE LIERMANN.